United States Patent
Kolodziej et al.

(10) Patent No.: US 8,709,175 B2
(45) Date of Patent: Apr. 29, 2014

(54) PISTON FOR AN INTERNAL COMBUSTION ENGINE COMPRISING A RING CARRIER BEING FORMED OF A CAST IRON ALLOY

(75) Inventors: Wojciech Kolodziej, Gorzyce (PL); Marck Skowron, Sandomierz (PL); Kazimierz Marszalik, Gorzyce (PL); Homi D. Jijina, Novi, MI (US); Laszlo Pelsoeczy, Burscheid (DE); Klaus Lades, Nuremberg (DE)

(73) Assignee: Federal-Mogul Nurnberg GmbH, Nurnberg (DD)

( * ) Notice: Subject to any disclaimer, the term of this patent is extended or adjusted under 35 U.S.C. 154(b) by 328 days.

(21) Appl. No.: 12/664,441

(22) PCT Filed: Apr. 17, 2008

(86) PCT No.: PCT/EP2008/054651
§ 371 (c)(1),
(2), (4) Date: Dec. 14, 2009

(87) PCT Pub. No.: WO2008/151873
PCT Pub. Date: Dec. 18, 2008

(65) Prior Publication Data
US 2010/0294229 A1 Nov. 25, 2010

(30) Foreign Application Priority Data
Jun. 12, 2007 (EP) .................................. 07011498

(51) Int. Cl.
*C22C 37/08* (2006.01)
*F02F 3/00* (2006.01)
*B32B 15/18* (2006.01)

(52) U.S. Cl.
USPC ................. 148/324; 420/16; 420/17; 420/14; 420/26; 428/682; 123/195 R; 123/193.6

(58) Field of Classification Search
CPC ............. C22C 37/08; F05C 2201/0439; F02F 3/0084; B32B 15/18
USPC ............. 420/9–33; 148/321–324; 123/195 R, 123/193.6; 428/682
See application file for complete search history.

(56) References Cited

U.S. PATENT DOCUMENTS 4,435,226 A  3/1984  Neuhauser et al.

FOREIGN PATENT DOCUMENTS

| DE | 26 46 276 A1 | 4/1978 |
| DE | 10049598 A1 | 4/2002 |
| EP | 0473 007 A1 | 3/1992 |
| GB | 508850 | 7/1939 |
| GB | 623360 | 5/1949 |
| GB | 2265154 A | 9/1993 |
| JP | 360110843 A * | 6/1985 |
| RU | 2361000 C * | 7/2009 |
| SU | 1294862 * | 3/1987 |
| SU | 2012661 C1 * | 5/1992 |

OTHER PUBLICATIONS

Machine-English translation of Japanese patent 360110843 A, Masuda et al., Jun. 17, 1985.*

* cited by examiner

*Primary Examiner* — Deborah Yee
(74) *Attorney, Agent, or Firm* — Robert L. Stearns; Dickinson Wright, PLLC

(57) ABSTRACT

An engine component such as, for example, an engine piston or a part thereof, for instance a ring carrier or piston boss bushing, consisting of a cast iron alloy that contains zirconium as an alloy constituent in an amount by weight of at least 0.01% and up to 0.1%.

5 Claims, 1 Drawing Sheet

PISTON FOR AN INTERNAL COMBUSTION ENGINE COMPRISING A RING CARRIER BEING FORMED OF A CAST IRON ALLOY

BACKGROUND OF THE INVENTION

1. Technical Field

The present invention relates to an engine component and the utilization of a new type of cast iron alloy for an engine component.

In the field of internal combustion engines, it is necessary to ensure especially good wear qualities for various parts and certain areas of the affected parts. This concerns cylinder liners and engine pistons, for example. For engine pistons in particular, the ring seal groove area requires reinforcement in order to improve the wear behavior. This particularly concerns the ring carriers which, although initially provided for as separate elements on an engine piston, can be integrally cast in, for example.

2. Prior Art

For the described areas, a high-alloy austenitic cast iron material is known from DE 100 49 598 A1 which can have different compositions.

DE 40 26 611 A1 discloses a material for a brake block that can contain zirconium.

SUMMARY OF THE INVENTION

The object of the invention is, with regard to the wear behavior, to provide an improved engine component as well as to propose the use of a cast iron alloy with which an improved engine component can be manufactured.

Accordingly, the new type of engine component, which can, for example, be a cylinder liner, an engine piston or a part thereof, such as a ring carrier or a piston boss bushing for example, consists of a cast iron alloy containing zirconium as an alloy constituent in an amount by weight of 0.1% or less. Upon analyzing an engine component manufactured in this manner, it was shown that zirconium acts advantageously in the formation of carbide, forming a particularly fine and uniformly distributed special carbide as compared with those already known cast iron alloys used for engine components. Additionally, it follows that, in the engine component manufactured from an alloy of this type, graphite was primarily formed as lamellar graphite precipitation, which further improved the wear behavior. Zirconium makes the structural arrangement more consistent and homogenous, leading to improved wear behavior.

Tests have shown that the specific rate of wear, which was initially measured in a wear test outside of the engine, is half of that of the previously used material. A further improvement is provided by the material according to the present invention in terms of the coefficient of thermal expansion. In conjunction with this, it should be observed that the new type of material can, for example, be used for a ring carrier that can be cast into a piston. Due to the temperature fluctuations that are typical of an operating engine, thermal stresses develop as a result of the differences between the thermal expansion coefficients of the ring carrier material on the one hand and the piston material on the other hand. There are correspondingly fewer stresses, the greater the similarity of the thermal expansion coefficients. It was ascertained for the material according to the present invention that its coefficient of thermal expansion is significantly closer to that of the piston alloy than is the case for those materials presently known. As a result of this, the stresses in the transitional area between the cast-in ring carrier and the piston material can be avoided, thus significantly reducing the tendency to form cracks and the danger of the ring carrier separating and the piston malfunctioning as a result.

In the end, an increased thermal conductivity was determined for the material according to the present invention as compared with the material used up to now. This improves the heat dissipation in an advantageous manner and by this achieves a temperature reduction in the grooves, so that the engine component manufactured according to the invention is also improved in this respect.

Preferred embodiments of the engine component according to the present invention are described in the further claims.

A zirconium proportion in an amount by weight of 0.01% as the minimum amount for the alloy constituent according to the present invention proved to be favorable.

Further, the use of nickel as an alloy constituent is preferred, in an amount by weight of 9.0% to 13.5%, preferably 10% to 12%.

It was found that the zirconium that is added according to the present invention forms particularly in combination with boron carbides and/or chrome carbides particularly stable, fine and uniformly distributed special carbides. Therefore, it is preferable that the material of the engine component contains boron in an amount by weight of 0.1% or less, preferably at least 0.005%, and/or chrome in an amount by weight of 1.0% to 2.6%.

Especially favorable properties were further ascertained when the material contains calcium as an alloy constituent in an amount by weight of 0.01% or less.

With regard to the structural arrangement, the cast iron material of the present invention exhibits in an advantageous manner an essentially austenitic structural arrangement.

As mentioned, the wear qualities can especially be thereby improved in that the material contains graphite in an advantageous mariner as lamellar graphite precipitation. Furthermore, the graphite can be present as spheroidal graphite, vermicular graphite or as temper carbon. The proportion of graphite in the form of lamellar graphite precipitation thereby corresponds to at least 50% by volume, preferably at least 75% by volume, especially preferred is at least 85% by volume, and is uniformly distributed by the zirconium and/or by an infusion treatment.

The advantageous properties in terms of the thermal expansion coefficient, as described above, can in particular be achieved if this lies within a range of $18.5\pm1\times10^{-6}$ mm/mm° C. at 50° C. and $27.5\pm1\times10^{-6}$ mm/mm° C. at 400° C.

With regard to thermal conductivity, particularly favorable properties were ascertained if this lies within a range of $29.5\pm1$ W/mK at 50° C. to $27.5\pm1$ W/mK at 400° C.

In addition, the present invention proposes, in view of a similar alloy previously disclosed for brake support plates, using a cast iron alloy that contains zirconium as an alloy constituent in an amount by weight of 0.1% or less as a reinforcement material for an engine component, such as a cylinder liner or an engine piston, especially in the ring seal groove area and particularly preferable for a ring carrier. By using a cast iron alloy of this type for manufacturing cylinder liners, engine pistons or ring carriers, or for the reinforcement of areas that are particularly subject to wear and tear, such as the ring seal groove area of an engine piston, the improved products described above can be manufactured.

DETAILED DESCRIPTION

The material according to the present invention was manufactured with the following alloy in weight % and various trials were performed.

| | |
|---|---|
| C: | 2.9% |
| Si: | 2.2% |
| Mn: | 1.5% |
| Cr: | 1.1% |
| Ni: | 11.1% |
| Cu: | 7.1% |
| B: | 0.01% |
| Zr: | 0.08% |
| S: | 0.04% |
| P: | 0.07% |

The remainder is Fe and unavoidable impurities.

The specific rate of wear was first measured in a test outside the engine. A rate of approximately $6 \times 10^{-12}$ m$^3$/Nm was ascertained for the standard material used as comparative example. For the material according to the present invention, this was merely about $3 \times 10^{-12}$ m3/Nm.

Figure 1:
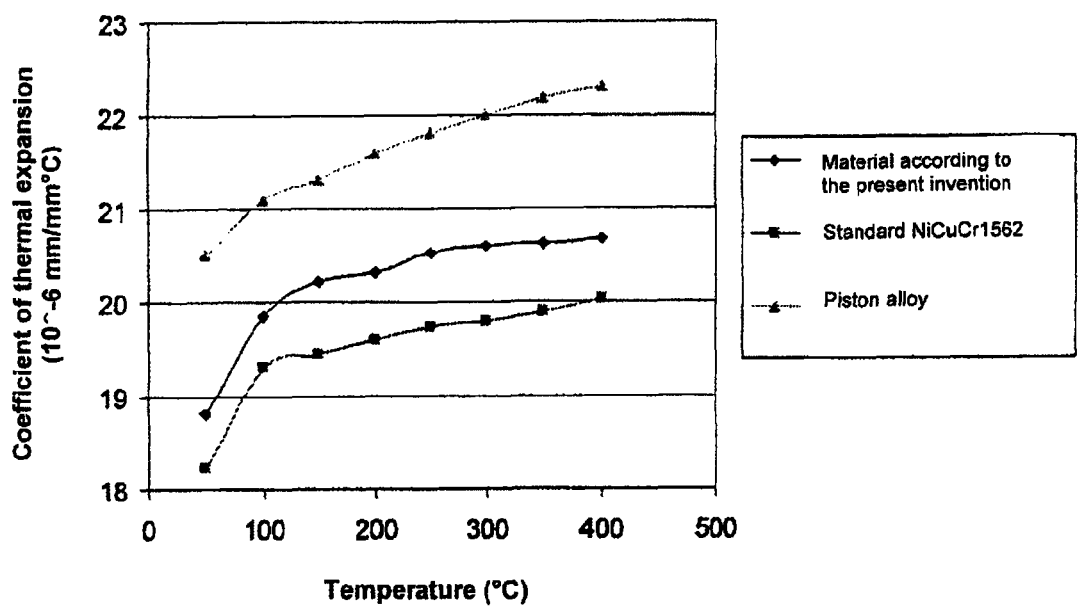
FIG. 1 shows a diagram for comparing the coefficient of thermal expansion of the material according to the present invention with a standard material and a conventional piston alloy.

Furthermore, the thermal expansion coefficient of the material according to the present invention was compared with that of a standard material and that of a conventional piston alloy. NiCuCr1562 was utilized as standard material. As can be seen from FIG. 1, the coefficient of thermal expansion of the piston alloy lies between 20.5 and approximately $22.5 \times 10^{-6}$ mm/mm° C. With the standard material, the coefficient of thermal expansion lies between 18.2 and $20 \times 10^{-6}$ mm/mm° C. By contrast, the coefficient of thermal expansion for the material according to the present invention lies approximately $0.6 \times 10^{-6}$ mm/mm° C. higher throughout the entire temperature range examined. The coefficient of thermal expansion thus lies closer to that of the piston alloy and therefore disadvantageous effects arising from the thermal expansion coefficient difference between the piston alloy and the ring carrier alloy can be minimized.

Figure 2:
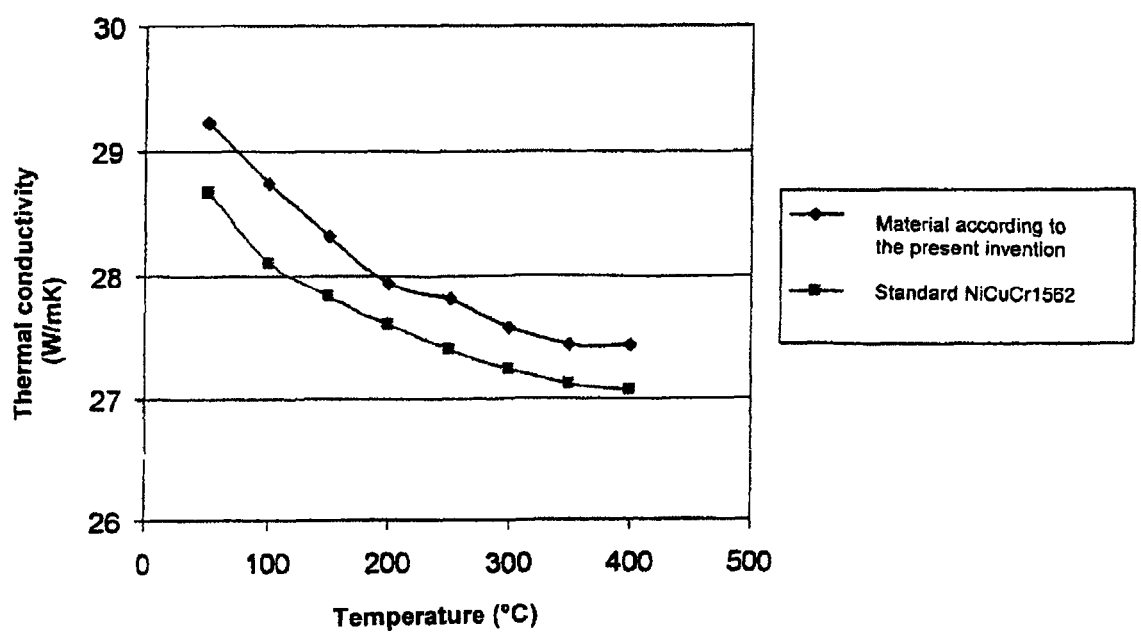
FIG. 2 shows a diagram for comparing the thermal conductivity of the material according to the present invention and a standard material.

Finally, the thermal conductivity of the standard material described above was compared with that of the material according to the present invention. In conjunction with this, the outcome is that, as shown in FIG. 2, the material according to the present invention exhibits a thermal conductivity that is about 0.5 to 1.0 W/mK higher at all measured temperatures than that of the standard material. The heat developing in the area of the engine can thus be better dissipated in an advantageous manner.

The invention claimed is:

1. A piston for an internal combustion engine comprising a ring carrier, the ring carrier being formed of a cast iron alloy comprising the following composition in weight %:

| | |
|---|---|
| C: | 2.2-3.8%, |
| Si: | 1.0-2.8%, |
| Mn: | 1.0-2.0%, |
| Cr: | 1.0-2.6%, |
| Ni: | 9.0-13.5%, |
| Cu: | 5.0-8.5%, |
| B: | 0.005-0.1%, |
| Zr: | 0.01-0.1%, |
| Nb: | max. 0.4%, |
| Ti: | max. 0.3%, |
| Mo: | max. 0.5%, |
| V: | max. 0.5%, |
| Ca: | max. 0.01%, |
| S: | max. 0.10%, |
| P, wherein the P is present in an amount of: | max. 0.08%, | the remainder is Fe and unavoidable impurities, and wherein the cast iron alloy contains graphite exclusively in the form of lamellar graphite precipitation, and wherein the portion of the piston surrounding the ring carrier is formed of NiCuCr1562, and wherein the ring carrier is cast into the piston such that the stresses in a transitional area formed between the cast-in ring carrier and the piston material are avoided, thus significantly reducing crack formation and avoiding separation of the ring carrier from the piston material and avoiding the piston malfunctioning as a result.

2. A piston according to claim 1, wherein the cast iron alloy of the ring carrier comprises an essentially austenitic microstructure.

3. A piston according to claim 1, wherein the cast iron alloy of the ring carrier has a thermal expansion coefficient in the range of $18.5 \pm 1 \times 10^{-6}$ mm/mm° C. at 50° C. and $27.5 \pm 1 \times 10^{-6}$ mm/mm° C. at 400° C.

4. A piston according to claim 1, wherein the cast iron alloy of the ring carrier has a thermal conductivity in the range of 29.5±1 W/mK at 50° C. and 27.5±1 W/mK at 400° C.

5. A piston according to claim 1, wherein the amount of nickel in the ring carrier is between 10% and 12%.

* * * * *